A. Z. COMBS.
COMBINED HOE AND PLANTER.
APPLICATION FILED FEB. 16, 1918.
1,282,194.
Patented Oct. 22, 1918.
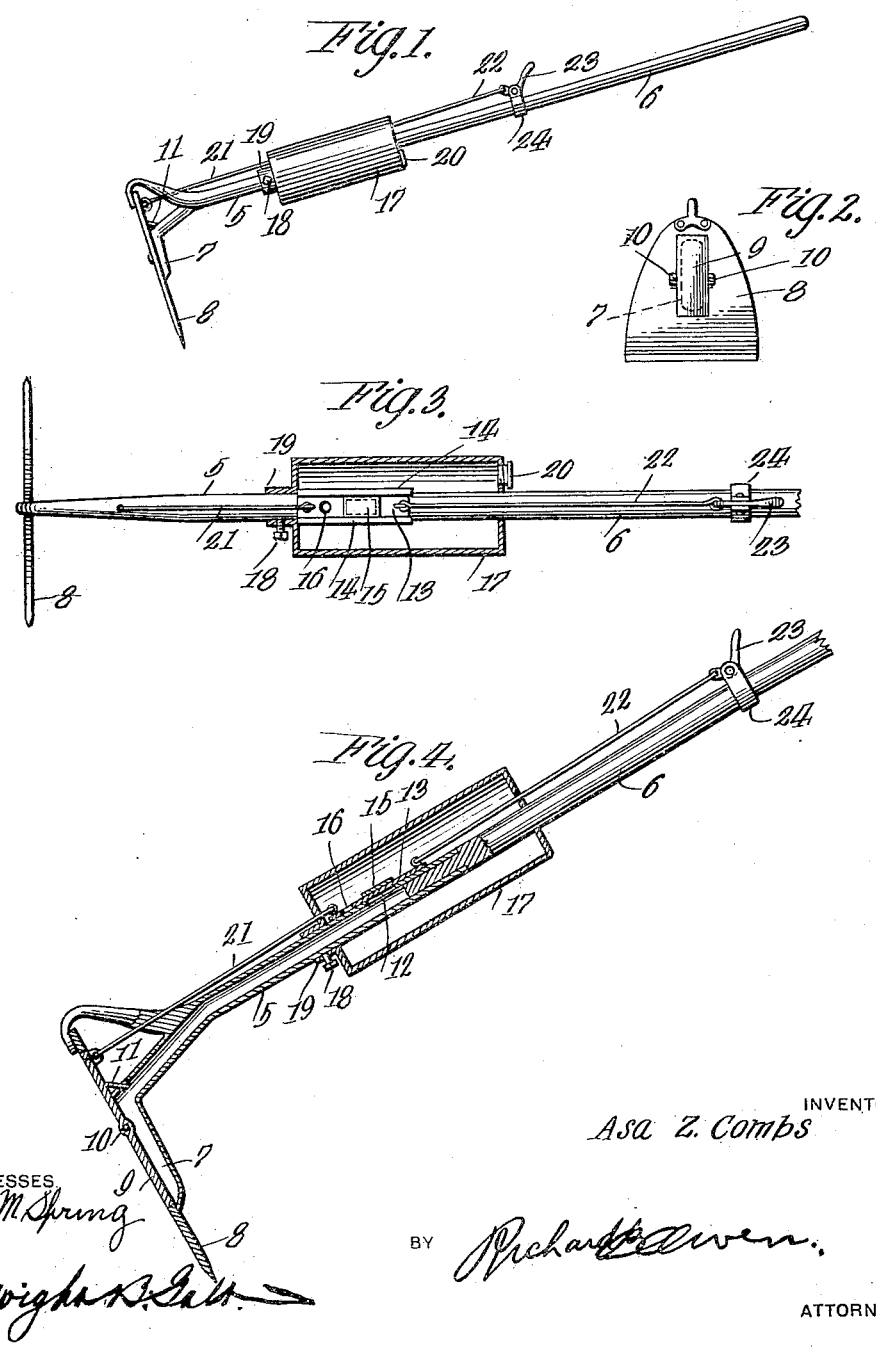
INVENTOR
Asa Z. Combs
WITNESSES
Guy M. Spring
Dwight K. Galt
BY Richard Owen.
ATTORNEY

UNITED STATES PATENT OFFICE.

ASA Z. COMBS, OF VICTORIA, TEXAS.

COMBINED HOE AND PLANTER.

1,282,194.     Specification of Letters Patent.     Patented Oct. 22, 1918.

Application filed February 16, 1918. Serial No. 217,659.

*To all whom it may concern:*

Be it known that I, ASA Z. COMBS, a citizen of the United States, residing at Victoria, in the county of Victoria and State of Texas, have invented certain new and useful Improvements in Combined Hoes and Planters, of which the following is a specification.

This invention relates generally to planters, and particularly to combined hoes and planters, having for its primary object to generally simplify and improve the construction and operation of devices of this character as well as to increase their efficiency.

A further object of the invention is to provide an improved planting mechanism in connection with the ordinary hand operated hoe, which is capable of depositing the seed directly upon the ground adjacent the cutting edge of the hoe, thus facilitating the proper placing of the seed.

A further object of the invention is to provide a device of the character stated which is equipped with improved means for preventing more than a predetermined quantity of seed being deposited at one time, thus eliminating the opportunity for waste.

Still further objects reside in providing a planter of the character mentioned which is of extremely simple and improved construction, which is composed of relatively few easily assembled parts, the said parts being constructed and arranged in such manner as to minimize the opportunity for wear or breakage, which is easy and positive in operation, and which proves thoroughly practical and efficient in use.

With these objects in view, together with others which will appear as the description proceeds, the invention resides in the novel formation, combination and arrangement of parts, all as will be described more fully hereinafter, illustrated in the drawings, and particularly pointed out in the claims.

In the drawings:—

Figure 1 is a side elevation of a combined hoe and planting mechanism constructed in accordance with the invention, Fig. 2 is an end view of the improved planter, Fig. 3 is a fragmentary plan view, parts in section, and showing the interior of the hopper and the seed control plate, and Fig. 4 is a slightly enlarged longitudinal sectional view taken through the lower end of the hoe, and illustrating the manner in which the various movable parts are assembled.

Referring now more particularly to the drawings, 5 indicates a tubular member, of substantially the same diameter as the staff 6 to which it is connected at one end. The tubular member 5 at its outer end extends downwardly, providing a pocket 7, and is connected rigidly to the blade 8 of the hoe. The blade 8 is provided with a central aperture or opening as shown, which is in communication with a pocket 7 at the adjacent tube end. The opening in the blade is normally closed by a plate 9 hinged as at 10 to the blade, and from the particular construction and arrangement of the plate it is obvious that the opening in the blade may be uncovered to permit of seed within the pocket 7 dropping to the ground. The upper portion of the plate 9 is provided with a rearwardly extending guard or shutter 11, which extends across the passage in the tubular member when the said plate has been moved to "open" position. Normally, or when the plate 9 is in "closed" position, the guard 11 will be withdrawn from the passage in the tubular member, and the flow of seed therethrough will be unobstructed.

The tubular member 5 adjacent the end with which it is connected with the staff 6 is provided with an opening 12, over which is mounted a seed slide 13. This slide comprises a plate or valve of suitable construction, and is confined within guides 14 arranged upon the tubular member. The opposing guides are connected by a relatively small plate 15, the latter being disposed directly above the opening 12 in the tubular member. The seed slide is provided with a relatively small opening 16 adapted to contain seed to be delivered to the tubular member, and in the delivering operation this opening 16 is brought into register with the opening 12 in the tube.

Inclosing the coupled ends of the tubular member 5 and staff 6 is a casing or hopper 17. This hopper may be of any desired size, and snugly fits around the staff and tubular member, being held against movement longitudinally thereof by the set screw 18 threaded through a collar 19 at one end of the casing and snugly fitting upon the tubular member. The hopper may be supplied with seed through an opening closed by the screw cap 20.

A rod 21 connects the upper end of the plate 9 with the lower end of the seed slide 13, so that movement of one of the said movable members will be transmitted to the other member. A rod 22 is connected to the upper end of the seed slide 13 and extends to the exterior of the casing through a suitable opening therein, and is connected at its outer end to a finger lever 23 carried by a collar 24 surrounding the staff 6.

When it is desired to use the hoe for digging purposes, it will be understood that the valve or controlling mechanism will be in closed position, so that no delivery of the seed is made. Should it be desired to plant with the hoe, the latter is positioned properly over the opening in the ground which has been made by the hoe blade, and the lever 23 is moved toward the operator. This movement causes the seed slide 13 to be moved upwardly, conveying in the opening 16 a quantity of seed, and these seeds are deposited in the tubular member 5 as soon as the opening 16 moves into registration with the opening 12. This upward movement of the seed slide causes the gate or plate 9 to be swung to open position, and any seed within the pocket 7 will be permitted to drop out upon the ground and into the opening provided. Any seed flowing downwardly through the tube 5 while the gate 9 is open will be intercepted and held against passing out upon the ground by the guard or shutter 11, but immediately upon the gate being swung to closed position, this guard will be withdrawn from the tubular member, thus allowing the seed to pass into the pocket 7. The cover plate 15 above the slide 13 prevents more than a predetermined quantity of seed passing into the tube.

From the foregoing it is obvious that I have provided a combined hoe and planter which is of extremely simple construction and operation and which will prove thoroughly practical and efficient for the attainment of the object set forth.

While the present is a disclosure of what is believed to be the preferred embodiment of the invention, it is to be understood that the invention is not limited thereto, as various changes in the minor details of construction, proportion, and arrangement of parts may be resorted to if desired without departing from the spirit of the invention as defined by the appended claims.

I claim:

1. In a planting tool, a tubular member having an opening adjacent one end, a movable plate closing the opposite end of said member, a seed container carried by said tubular member, a seed slide arranged upon said tubular member and having an opening therein adapted to register with the opening in said tubular member and a connection between said movable plate and said seed slide whereby movements of one will govern the movements of the other.

2. In a planting tool, a staff, a tubular member connected at one end to said staff, a hinged plate closing the opposite end of said member, a seed slide adapted when moved in one position to deliver a predetermined quantity of seed to said tubular member, a connection between said plate and slide whereby the former will uncover the adjacent end of the tubular member when the slide is in seed delivering position, a lever on said staff, and a rod connecting said seed slide and said lever.

In testimony whereof I affix my signature in presence of two witnesses.

ASA Z. COMBS.

Witnesses:
 HERMAN FISCHER,
 K. LEE PRADE.